United States Patent [19]

Ganguli et al.

[11] Patent Number: 4,734,392

[45] Date of Patent: * Mar. 29, 1988

[54] NICKEL/ALUMINA CATALYST

[75] Inventors: Keshab Ganguli, Bleiswijk; Peter Nootenboom, Oud-Beyerland; Cornelis Lok, Rockanje, all of Netherlands

[73] Assignee: Internationale Octrooi Maatschappij, Rotterdam, Netherlands

[ * ] Notice: The portion of the term of this patent subsequent to Apr. 14, 2004 has been disclaimed.

[21] Appl. No.: 38,132

[22] Filed: Apr. 14, 1987

Related U.S. Application Data

[63] Continuation of Ser. No. 747,440, Jun. 21, 1985, Pat. No. 4,657,889.

[30] Foreign Application Priority Data

Jun. 21, 1984 [NL] Netherlands ......................... 8401965

[51] Int. Cl.[4] ......................... B01J 21/04; B01J 23/74
[52] U.S. Cl. ..................................... 502/335; 260/409
[58] Field of Search ......................... 502/335; 260/409

[56] References Cited

U.S. PATENT DOCUMENTS

| | | | |
|---|---|---|---|
| 2,211,022 | 8/1940 | Michael et al. | 502/335 |
| 2,566,362 | 9/1951 | Paterson | 502/259 X |
| 4,065,484 | 12/1977 | Dobashi | 502/335 X |
| 4,307,248 | 12/1981 | Barnett et al. | 502/328 X |

OTHER PUBLICATIONS

Applied Catalysis, 7, (1983), pp. 85–90, Elsevier Science Publishers B.V., Amsterdam.
European Search Report, dated Nov. 6, 1985.

*Primary Examiner*—W. J. Shine
*Attorney, Agent, or Firm*—Cushman, Darby & Cushman

[57] ABSTRACT

The invention provides a nickel/alumina catalyst, with an atomic ratio of nickel/aluminum between 10 and 2, an active nickel surface area between 70 and 150 $m^2/g$ nickel and an average pore size, depending on the above atomic ratio, between 4 and 20 nanometers. Preferably the nickel/aluminum atomic ratio is between 10 and 4. Preferably the catalyst has a specific porous structure.

The invention also provides a method for preparing the catalyst by a two step process involving precipitating nickel ions and adding during a second, so-called aging step a soluble aluminum compound.

The catalyst is useful for hydrogenating unsaturated organic compounds in particular oils.

5 Claims, 1 Drawing Figure

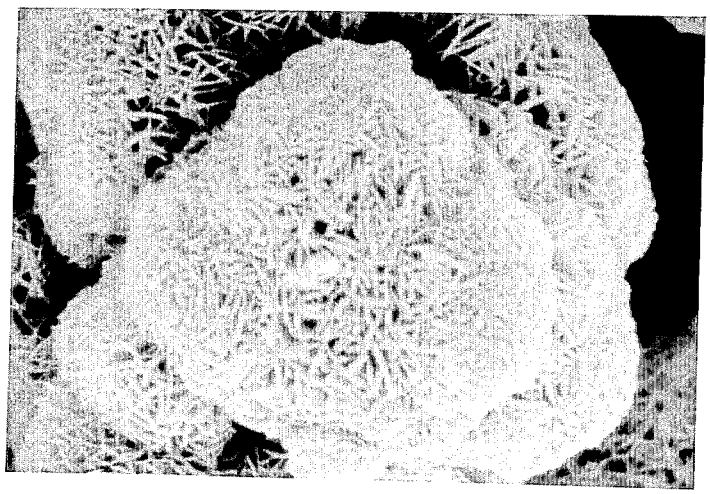

NICKEL/ALUMINA CATALYST

This is a continuation of U.S. application Ser. No. 747,440 filed June 21, 1985, now U.S. Pat. No. 4,657,889.

The application relates to a hydrogenation catalyst containing nickel and alumina, as well as to the preparation and use thereof.

Catalysts containing nickel/alumina are known and are mainly applied for the preparation of methane-containing gas. It is usual to prepare such catalysts by co-precipitating nickel- and aluminum ions from a solution with an alkaline reagent like, e.g., ammonium carbonate as is disclosed in U.S. Pat. No. 3,320,182 (Esso Research).

According to this co-precipitation method, catalysts are obtained which have reasonably good properties, but the filterability of the catalyst precursor (green cake) and catalytic properties, particularly in the hydrogenation of unsaturated triglyceride oils, are inadequate. The BET total surface area of these catalysts is typically below 200 $m^2$/g of catalyst and the average pore size is in the order of a few nanometers.

The present invention provides novel nickel/alumina catalysts which have considerably improved properties and which have an atomic ratio of nickel/aluminium between 10 and 2, the active nickel surface area is between 70 and 150 $m^2$/g nickel and the average pore size, depending on the above atomic ratio, is between 4 and 20 nanometers.

Preferably the atomic ratio of nickel to aluminium of these catalysts is between 10 and 4 because this results in a higher hydrogenation selectivity of the catalyst i.e. less formation of completely saturated triglycerides which is probably due to a higher average mesopore size.

Further these catalysts preferably have an open, porous structure with macropores of 100–500 nanometers and mesopores having an average size between 8 and 20 nanometers. As is apparent from electronmicroscopy the macropores are formed by interconnected catalyst platelets.

As a rule, these catalysts have an active nickel surface area between 90 and 150 $m^2$/g of nickel. The BET total surface area is usually between 90 and 450 $m^2$/g of catalyst. The average diameter of the nickel crystallites is preferably between 1 and 5 nanometers.

BRIEF DESCRIPTION OF THE DRAWING

The FIGURE (FIG. 1) is an electron micrograph of a catalyst according to the invention.

The above-mentioned improved catalysts can be advantageously prepared by a process in which an insoluble nickel compound is precipitated from an aqueous solution of a nickel salt with an excess alkaline precipitating agent, which precipitate is subsequently allowed to age in suspended form and is then collected, dried and reduced, wherein, after the nickel ions have been precipitated, a soluble aluminium compound is added. The soluble aluminium compound can be added as a solution but also as undissolved crystals. The soluble aluminium compound being added after the nickel ions have been substantially precipitated is e.g. aluminium nitrate, sodium aluminate or alumina which dissolves at least partly in the excess alkali.

After precipitation and ageing according to the invention, the precipitate is separated from the liquid, usually washed, dried and activated with hydrogen at an elevated temperature, this by usual procedures.

Nickel compounds which can be used as starting material for the catalysts according to this invention are water-soluble nickel compounds such as nitrate, sulphate, acetate, chloride and formate. The solutions which are charged to the precipitation reactor preferably contain between 10 and 80 g nickel per liter; especially preferred are solutions which contain between 25 and 60 g nickel per liter.

Alkaline precipitation agents which can be used as starting material for the catalysts according to the present invention are alkali metal hydroxides, alkali metal carbonate, alkali metal bicarbonate, the corresponding ammonium compounds and mixtures of the above-mentioned compounds. The concentration of the alkaline solution which is fed into the precipitation reactor is preferably between 20 and 300 g alkaline material (calculated as anhydrous material) per liter (in as far as the solubility allows this), more particularly between 50 and 250 g per liter.

It is convenient to use both solutions (of metal salt and alkaline compound) in almost the same concentrations (expressed in equivalents), so that approximately the same volumes can be reacted.

The metal-containing solution and the alkaline solution are added in such amounts per unit of time that a small excess of alkaline compound is present during the precipitation step, so that the normality of the liquid is between 0.05 and 0.5, preferably between 0.1 and 0.3 (this normality is determined by titrating a solution of hydrochloric acid, with methyl-orange as indicator). Sometimes it is necessary to add some more alkaline solution during the ageing step, in order to keep the normality within the range indicated above.

The precipitation reactor has such dimensions with respect to the amounts of liquid pumped in, that short average residence times can be obtained. As a rule, average residence times of between 0.1 sec. and 10 minutes, preferably between 0.2 sec. and 4.5 minutes are used in the precipitation reactor.

In a preferred embodiment, in which the precipitation step (step 1) is carried out continuously, the amounts of solutions fed into the precipitation reactor are controlled by measuring, optionally continuously, the normality or pH of the reactor effluent. The temperature at which the precipitation takes place can be controlled by adjusting the temperatures of the liquids fed in. The required vigorous agitation of the liquid in the precipitation reactor preferably takes place with a mechanical energy input of between 5 and 2000 watts per kg of solution. More preferably the agitation takes place with a mechanical energy input of 100 to 2000 watts per kg of solution.

The reaction mixture obtained from the precipitation reactor goes immediately thereafter to a stirred postreactor of a significantly higher capacity in which the suspension is agitated and aged. At this stage soluble aluminium compounds and possible other compounds are added, and optionally carrier material and promotors if any. The amount of aluminium compound added is 0.1 to 0.5, preferably 0.1 to 0.25 mol aluminium ions per gram atom of nickel in the suspension. Preferably, a soluble compound such as aluminium nitrate or sodium aluminate is added. Preferably the liquid in the ageing reactor, thus during the ageing step, is kept at a temperature between 40° and 100° C., preferably between 60° and 98° C.

The precipitation step and also the maturing step can be carried out batchwise (=discontinuously), continuously and semi-continuously (e.g. according to the cascade method).

Usually the normality of the liquid in the ageing-reactor during the ageing step (step 2) is kept in the same range as during the precipitation step (step 1); if necessary by adding some more alkali. The ageing step can be carried out in one or more reactors, the (total) average residence time being maintained between 20 and 180 minutes, preferably between 30 and 150 minutes. If two or more reactors are used, it is preferred to have the temperature in the second or further reactor 5 to 15 centigrades lower than in the preceding ageing reactor.

After the ageing step has been completed, the solid material is separated from the mother liquor, usually washed, dried, optionally ground and calcined and thereafter activated with hydrogen at an temperature, between 250 and 600, preferably between 350° and 500° C. This activation can take place at atmospheric pressure or at increased pressure.

The present process involving separate precipitation and ageing steps results in a catalyst precursor/green cakes which has a considerably improved filteratively than a co-precipitated precursor at least a four fold improvement. Preferably before drying, or during a step preceding that, promoters can be added. Suitable amounts of promotors are from 0.5 to 10%, calculated on the weight of nickel, of elements such as molybdenum, cobalt, copper, iron, lanthanum, magnesium, or other elements and combinations thereof.

The solid material is preferably washed with water; sometimes some alkaline material or a surface active material is added to the washing water. Also an organic solvents e.g. acetone can be advantageously used during washing. Drying preferably takes place with hot air. Spray-drying is preferred but freeze-drying is also quite possible.

The catalyst thus obtained is especially suitable for the hydrogenation of unsaturated organic compounds particularly oils, fats, fatty acids and fatty acid derivatives like nitriles. This hydrogenation is carried out with hydrogen at an increased temperature (80°-250° C.) and optionally an increased pressure (0.1-5.0 $10^6$ Pa).

The hydrogenated products thus obtained, e.g. hydrogenated oils, show favourable properties such as low tri-saturated content, sometimes combined with a steep dilatation curve.

The invention is illustrated by the following examples:

EXAMPLE 1

Solutions of $Ni(NO_3)_2$ (35 g Ni per liter) and $Na_2CO_3$ anh. (100 g/l) were continuously pumped at equal flow rates into a vigorously stirred precipitation reactor, where nickel hydroxide/carbonate was precipitated at a temperature of 20° C. The pH of the suspension in this reactor was 9.4. In this precipitation reactor (volume 25 ml), the suspension had an average residence time of 0.5 min. The suspension was then transferred continuously to a second, ageing reactor (volume 1500 ml), in which the average residence time was 30 min. and the temperature was 97° C. Simultaneously, an amount of aluminium ions was continuously dosed into this reactor, as an aqueous solution of aluminium nitrate, at a rate of 0.13 g aluminium per min. The average Al/Ni atomic ratio was 0.3.

The pH of the suspension in the second reactor was 9.0. The volume of the liquid in the second reactor was kept constant. In Table I this is tabulated.

The ageing step was terminated after 90 min. (3× the average residence time), and the suspension in the reactor filtered. The green filter cake thus obtained was washed with distilled water. The washed cake was: (A) dried at 120° C. in a drying oven; (B) spray dried; (C) washed with acetone and dried at room temperature. Thereafter the catalyst was activated for 30 minutes with hydrogen at a temperature of 400° C. From the determination of the nickel surface area by hydrogen chemiabsorption an average nickel crystallite size of 2.0 nanometers was calculated.

The filterability of the green cake was determined as follows:

1 liter of a green cake aqueous suspension with 4% (w.w.) solids from the ageing reactor was filtered over a Büchner funnel with a Schleicher and Schüll (trade name) black band filter with a diameter of 125 mm. The vacuum applied was 3–4,000 Pa, and obtained with an aspirator. The time of filtration in minutes necessary for filtering 4 liters of distiled water over the bed of green cake obtained was taken as a yardstick of the filterability of the green cake. This time of filtration is indicated i.a. in Table I.

The activity of the catalyst in the hydrogenation of fish oil (iodine value 165) was determined as follows:

150 g fish oil was hydrogenated at 180° C. and a hydrogen pressure of $1.10^5$ Pa with 0.07% (w.w.) of catalyst. The decrease in the refractive index of the fish oil was compared with the decrease obtained in a similar hydrogenation with a known standard catalyst and the activity was expressed as a percentage of the activity of the standard catalyst.

As to the selectivity of the catalyst: 250 g fish oil (iodine value 165) were hydrogenated to an iodine value of 85 with 0.1% (w.w.) catalyst and 60 liters $H_2$/hour at a pressure of $1.10^5$ Pa at 180° C. The melting point of the hydrogenated oil was determined *and* the time required to reach an iodine value of 85. Together they are a yardstick for the selectivity.

The oil filtration of the catalyst was determined as follows:

After the hydrogenation the suspension, i.e. the hydrogenated oil containing the catalyst, was cooled to 90° C. and pumped to a closed, double-walled filtration vessel which was connected to a thermostat at 90° C. The bottom of this vessel contained a cotton filter cloth of 30 cm diameter. After pumping the oil and the catalyst into the filtration vessel an overpressure of $3.10^5$ Pa. was applied. During the filtration this pressure was maintained with a Kendall pressure regulator. After increasing the pressure to $3.10^5$ Pa (t=o) the time of filtration time was measured. The weight of the filtered oil was determined as a function of time. Subsequently, the weight of the filtered oil (x-axis) was plotted graphically against the filtration time divided by the relevant weight of the oil (y-axis). The slope of the line obtained was taken as a yardstick for the filter resistance of the cake. These values are indicated in Table II for 150 g oil in min./g.

EXAMPLES 2 AND 3

In accordance with the procedure described in Example 1, more catalysts according to the invention were prepared, variations being made, however, in the amounts of starting materials and conditions, as indicated in Table I below. The properties of these catalysts are summarized in Table II.

It is noteworthy that, on an average, short hydrogenation times could be used and the catalyst retained its activity for a prolonged period when compared with a co-precipitated catalyst. An excellent selectivity was also observed, i.e. there was less tri-saturated triglyceride formed especially in the hydrogenation of soya bean oil. Further, the melting point of the hydrogenated oils appeared to be practically independent of the atomic ratio of Al to Ni and of the conditions of washing and drying. Finally, also the filtration properties of green cake and catalyst after hydrogenation were particularly favourable.

EXAMPLES 4, 5 AND 6

The procedure followed was identical to that of Example 1. In this case solutions of $NiSO_4$ (35 g/l Ni) and $Na_2CO_3$ anh●(100 g/l) were brought together at equal flow rates (32 ml/min.$^{-1}$) at 20° C. The pH of the suspension in the precipitation reactor was 9.4. This suspension was subsequently transferred continuously to a second, ageing reactor (volume 1920 ml). Simultaneously, an amount of aluminium ions was dosed continuously into this second reactor. In the case of Example 4 an aqueous sodium aluminate was dosed (0.068 g Al/min.) whereas in the case of Examples 5 and 6 a solution of aluminium oxide in 4N aqueous sodium hydroxide was dosed (0.13 g Al/min.) FIG. 1 which is an electron micrograph of the catalyst of Example 6 at a magnification of $10^4$ shows the open spongy structure with the interconnected catalyst platelets forming the macropores. The catalyst preparation is summarized in Table III and the properties in Table IV.

COMPARATIVE EXPERIMENTS 1-2

The preparation was carried out according to Example I. In this case a solution of aluminium nitrate in water was dosed into the precipitation reactor.

The results are tabulated in Tables V and VI.

EXAMPLE 7

Herein the hydrogenation of C18-nitrile to amine is described. The catalyst was prepared according to Example 2. The reaction was carried out in an autoclave of 200 ml, charged with 70 ml nitrile (acid value 0.2) and amount of catalyst corresponding with 0.12% Ni at a hydrogen pressure of 2.5 $10^6$Pa.

The temperature was 110° C. at the start of the reaction and increased to 120° C. due to the heat of reaction and maintained for 2.5 hours.

The ratio $H_2:NH_3$ was 1:1. The conversion of the nitrile was 92%. The yield of primary amine was 91% and the selectivity for primary amine 99%.

The selectivity and rate of filtration of the spent catalyst were higher than those which were obtained after hydrogenation with the catalyst according to comparative experiment 2.

EXAMPLE 8

The catalyst prepared according to example 6 was tested in the hydrogenation of soybean oil. In a so-called loop jet reactor soybean oil (IV 132) was hydrogenated using 0.02% (w.w) of Ni, at a hydrogen pressure of 6.$10^5$Pa and a temperature of 110° C. The reaction rates of the hydrogenation obtained with various amounts of said catalyst showed this catalyst to be more active than a commercially available nickel-on-guhr catalyst at equal nickel levels. Moreover, the selectivity of the reaction using said catalyst (i.e. low saturated $C_{18}$ content ($C_{18:0}$) and low solid fat contents at 30° C. at an IV of 90 ($N_{30}$)) was excellent compared to values obtained with known Ni-on-guhr catalysts as is shown in Table VII.

EXAMPLE 9

The same catalyst as used in example 8 was tested in the hydrogenation of rapeseed oil (IV 117.5). In a so-called BUSS reactor rapeseed oil was hydrogenated using 0.05% (w.w.) Ni at a hydrogen pressure of 4.$10^5$ Pa and a temperature of 175° C. A high selectivity with respect to $C_{18:0}$ content and $N_{30}$ values was obtained with said catalyst compared with the two Ni-on-guhr catalysts. ($N_{30}$ values: 1.5% and 3.3% respectively and $C_{18:0}$: 10.0% and 11.5% respectively).

TABLE I

| Example | 1 | 2 | 3 |
|---|---|---|---|
| Ni/Al atomic ratio | 3.33 | 10.0 | 2.0 |
| Molarity of the soda solution | 1.0 | 1.0 | 1.0 |
| Molarity of the nickel solution | 0.6 | 0.6 | 0.6 |
| Precipitation temperature (°C.) | 20 | 20 | 20 |
| Average precipitation time (min.) | 0.5 | 0.5 | 0.5 |
| pH value | 9.4 | 9.4 | 9.4 |
| Ageing temperature (°C.) | 97 | 97 | 97 |
| Average ageing time (min.) | 30 | 30 | 30 |
| pH value | 9.0 | 9.0 | 9.0 |
| Filterability of green cake (min.) | 3 | 1 | 4 |
| Properties of the catalyst | A     B | A     B | A     B |
| Active Ni surface area ($m^2$/g Ni) | 115   139 | 95   100 | 95   120 |
| Ni crystallite size (nm) | 1.7   2.3 | 4.0   1.5 | 4.0   2.8 |
| Average pore size (nm) | 6 | 16 | 5.5 |
| BET-total surface area ($m^2$/g catalyst) | 320 | 180 | 320 |

A = washed with water
B = washed with acetone

TABLE II

| Example | 1 | 2 | 3 |
|---|---|---|---|
| Ni % in the reduced catalyst | 85 | 90 | 75 |
| Fish oil activity after washing with water (%) | 98 | 90 | 45 |
| Fish oil activity after spray-drying (%) | 150 | 128 | 120 |
| Fish oil activity after washing with acetone (%) | 154 | 133 | 132 |
| Selectivity: Hydrogenation time (min.) | | | |
| Water drying | 198 | 220 | 330 |
| Spray-drying | 100 | 120 | 130 |
| Acetone drying | 84 | 84 | 84 |
| Melting point (°C.) | | | |
| Water drying | 32.0 | 32.5 | 32.0 |
| Spray-drying | 32.0 | 33.0 | 33.0 |
| Acetone drying | 31.5 | 32.0 | 32.0 |
| Oil filtration after hydrogenating 150 g oil (min · $g^{-1}$) | | | |
| Water drying | 0.1 | 0.1 | 0.1 |
| Spray-drying | 0.2 | 0.2 | 0.2 |
| Acetone drying | 0.25 | 0.25 | 0.2 |

TABLE III

| Example | 4 | 5 | 6 |
|---|---|---|---|
| Ni/Al atomic ratio | 10 | 6 | 5 |

TABLE III-continued

| Example | 4 | | 5 | | 6 | |
|---|---|---|---|---|---|---|
| Molarity of the soda solution | 1.0 | | 1.0 | | 1.0 | |
| Molarity of the nickel solution | 0.6 | | 0.6 | | 0.6 | |
| Precipitation temperature (°C.) | 20 | | 20 | | 20 | |
| Average precipitation time (min.) | 0.5 | | 0.5 | | 0.5 | |
| pH value | 9.4 | | 9.4 | | 9.4 | |
| Ageing temperature (°C.) | 98 | | 98 | | 98 | |
| Average ageing time (min.) | 30 | | 30 | | 30 | |
| pH value | 9.7 | | 9.3 | | 9.4 | |
| Filterability of green cake (min.) | 2.5 | | 2 | | 2 | |
| Properties of the catalyst | A | B | A | B | A | B |
| Active Ni surface area ($m^2$/g Ni) | 60 | 100 | 110 | 140 | 110 | 140 |
| Ni crystallite size (nm) | 4.0 | 1.5 | 2.3 | 2.0 | 2.3 | 2.0 |
| Average pore size (nm) | 16 | | 11 | | 11 | |
| BET-total surface area ($m^2$/g catalyst) | 180 | | 250 | | 250 | |

A = washed with water
B = washed with acetone

TABLE IV

| Example | 4 | 5 | 6 |
|---|---|---|---|
| Ni % in the reduced catalyst | 85 | 85 | 85 |
| Fish oil activity after washing with water (%) | 100 | 100 | 110 |
| Fish oil activity after spray-drying (%) | 125 | 140 | 150 |
| Selectivity: | | | |
| Hydrogenation time (min.) | | | |
| Water drying | 200 | 150 | 120 |
| Spray-drying | 130 | 97 | 80 |
| Melting point (°C.) Spray-drying | 32.0 | 33.0 | 33.0 |
| Oil filtration after hydrogenating 150 g oil (min · $g^{-1}$) | | | |
| Water drying | | 0.12 | |
| Spray-drying | | 0.18 | |

TABLE V

| Comparative experiment | 1 | 2 |
|---|---|---|
| Ni/Al atomic ratio | 5 | 5 |
| Molarity of the soda solution | 1.0 | 1.0 |
| Molarity of the nickel solution | 0.6 | 0.6 |
| Precipitation temperature (°C.) | 20 | 20 |
| Average precipitation time (min.) | 0.5 | 0.5 |
| pH value | 9.4 | 9.4 |
| Ageing temperature (°C.) | 97 | 97 |

TABLE V-continued

| Comparative experiment | 1 | | 2 | |
|---|---|---|---|---|
| Average ageing time (min.) | 30 | | 30 | |
| pH value | 11.0 | | 9.4 | |
| Filterability of green cake (min.) | 32 | | 32 | |
| Properties of the catalyst | A | B | A | B |
| Active Ni surface area ($m^2$/g $Ni^{-1}$) | 70 | 125 | 70 | 135 |
| Ni crystallite size (nm) | 3.0 | 1.6 | 3.6 | 1.6 |
| Average pore size (nm) | 5 | | 5 | |
| BET-total surface area ($m^2$/g catalyst) | 380 | | 380 | |

TABLE VI

| Comparative experiment | 1 | 2 |
|---|---|---|
| Ni % in the reduced catalyst | 85 | 85 |
| Melting point (°C.) | 31.0 | 32.0 |
| Hydrogenation time (min.) Spray drying | 150 | 120 |
| Oil filtration after hydrogenating 150 g oil (min · $g^{-1}$) Spray-drying | 0.17 | 0.17 |
| Fish oil activity Spray-drying (%) | 110 | 110 |

TABLE VII

| Catalyst | Hydrogenation rate (IV decrease/min.) | $C_{18:0}$ (%) | $N_{30}$ (%) |
|---|---|---|---|
| Example 6 | 2.2 | 8.2 | 0.7 |
| Ni—on-guhr-1 | 1.8 | 10.5 | 4.3 |
| Ni—on-guhr-2 | 1.7 | 9.5 | 3.2 |

I claim:

1. A nickel alumina catalyst wherein the atomic ratio of nickel/aluminum is between 10 and 2, the active nickel surface area is between 90 and 150 $m^2$/g nickel, the average pore size, depending on the above atomic ratio, is between 4 and 20 nanometers and the nickel crystallites have an average diameter between 1 and 5 nanometers.

2. A catalyst according to claim 1, wherein the atomic ratio is between 10 and 4.

3. A catalyst according to claim 1, wherein the BET total surface area is between 90 and 450 $m^2$/g catalyst.

4. A catalyst according to claim 1, wherein the catalyst has an open, porous structure with macropores of 100–500 nanometers and a mesopore structure having an average pore size between 8 and 20 nanometers.

5. A catalyst according to claim 4 wherein the macropores are formed by interconnected catalyst platelets.

* * * * *